US 6,727,826 B1

(12) United States Patent
Ki Kwan et al.

(10) Patent No.: US 6,727,826 B1
(45) Date of Patent: *Apr. 27, 2004

(54) REMOTELY CONTROLLED TOY AND WIRELESS REMOTE OPERABLE IN A POINT OF SALE PACKAGE

(75) Inventors: David Chu Ki Kwan, Hong Kong (HK); Steven Lebensfeld, Laurel Hollow, NY (US); Carmine Russo, West Islip, NY (US); Russell Javors, Massepequa, NY (US)

(73) Assignee: Toymax INC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,402

(22) Filed: Dec. 30, 1999

Related U.S. Application Data

(63) Continuation of application No. 09/006,026, filed on Jun. 12, 1998, now Pat. No. 6,011,489.

(51) Int. Cl.$^7$ .............................................. G08C 19/00
(52) U.S. Cl. .......................... 340/825.72; 340/825.69
(58) Field of Search ....................... 340/825.72, 825.69, 340/24; 348/734, 114; 359/196; 379/102.07; 446/454, 455, 456; 345/158

(56) References Cited

U.S. PATENT DOCUMENTS

| 4,334,221 | A |   | 6/1982  | Rosenhagen et al. |
| 4,482,947 | A |   | 11/1984 | Zato et al. |
| 4,925,025 | A |   | 5/1990  | Anten et al. |
| 4,938,483 | A |   | 7/1990  | Yavetz |
| 5,172,806 | A |   | 12/1992 | Mickelberg |
| 5,289,916 | A |   | 3/1994  | Mickelberg |
| 5,410,326 | A | * | 4/1995  | Goldstein ................... 348/734 |
| 5,411,138 | A |   | 5/1995  | Klawiter |
| 5,438,325 | A | * | 8/1995  | Nishigaki et al. ....... 340/825.24 |
| 5,457,478 | A | * | 10/1995 | Frank .......................... 345/158 |
| 5,474,486 | A | * | 12/1995 | Chilton et al. .............. 446/456 |
| 5,481,257 | A | * | 1/1996  | Brubaker et al. |
| 5,695,056 | A |   | 12/1997 | Blender et al. |
| 5,794,164 | A |   | 8/1998  | Beckert et al. |
| 6,011,489 | A | * | 1/2000  | Ki Kwan et al. ....... 340/825.72 |

FOREIGN PATENT DOCUMENTS

| CA | 1 244 089 A   | 11/1988 |
| CA | 2.211.660 A1  | 6/1997  |
| DE | 24 00 966     | 1/1975  |
| DE | 3037265 A1    | 4/1982  |
| DE | 37 02338 A1   | 1/1987  |
| EP | 0 151 250     | 8/1985  |
| EP | 0 752 634 A 1 | 1/1997  |
| JP | 57-77162      | 10/1985 |
| JP | 62-22960      | 2/1987  |
| JP | 4-202918      | 7/1992  |
| JP | 5-127737      | 5/1993  |

* cited by examiner

*Primary Examiner*—Michael Horabik
*Assistant Examiner*—William Bangachon
(74) *Attorney, Agent, or Firm*—Richard B. Klar

(57) ABSTRACT

A "try me" feature is disclosed for remotely controlled devices such as remotely controlled toys for point of sale demonstration or sampling. The disclosure describes a secondary link between the remote control device and the remotely controlled device. When the secondary link is selected or present, activation of a control on the remote control device will cause the remotely control device to react the same or similar to the way it reacts under wireless remote control, but via the secondary link. The secondary link may be configured as a disconnectable wired coupling. The remotely controlled device and the remote control device may be contained in a point of sale package or configured in a point of sale display.

7 Claims, 3 Drawing Sheets

REMOTELY CONTROLLED TOY AND WIRELESS REMOTE OPERABLE IN A POINT OF SALE PACKAGE

CROSS REFERENCE TO RELATED APPLICATION

Some of the subject matter disclosed herein is also disclosed in application Ser. No. 08/892,374 filed Jul. 14, 1997 titled "TOY WITH REMOTELY CONTROLLED SECURITY ALARM", the entire disclosure of which is incorporated herein by reference. The invention disclosed herein is applicable to, among other devices, the toy disclosed application Ser. No. 08/892,374.

The present application is a continuation of Ser. No. 09/006,026 filed on Jan. 12, 1998 now U.S. Pat. No. 6,011,489 and claims priority under 35 U.S.C. 120.

BACKGROUND OF THE INVENTION

The invention disclosed herein relates to a remotely controlled toy or other device operated with a wireless remote control device, which may be sampled, tried or otherwise operated from the remote control device using a link other than the wireless link used in normal operation of the toy or other device. This facilitates, makes practical or enables operation of the remotely controlled device, for example in a point of sale package or a point of sale display configuration.

Point of sale packaging which enables a toy to be viewed, touched and/or operated while in the package is disclosed, for example, in U.S. Pat. Nos.: 4,925,025 (Anten et al.); 5,172,806 (Mickelberg); 5,289,916 (Mickelberg); 5,411,138 (Klawiter); and 5,695,056 (Bender et al.).

The invention disclosed herein facilitates, makes practical or enables a remotely controlled toy or other device to be operated or tried while in a package, for example by a prospective purchaser in a point of sale package. The invention thus provides a "try me" feature for a remotely controlled device at the point of sale.

OBJECTS AND SUMMARY OF THE INVENTION

It is an object of the invention disclosed herein to enable a remotely controlled toy or other device normally operated by means of a wireless remote control device to be sampled, tried or otherwise operated using a link other than the wireless link used in normal operation.

It is another object of the invention to facilitate, make practical or enable a remotely controlled toy or other device normally operated by a wireless remote control device to be sampled, tried or otherwise operated while in a package, e.g., a point of sale package, or a point of sale display configuration.

It is another object of the invention to provide a selectable wireless coupling and a wired coupling between a toy or other remotely controlled device and a remote control therefor.

The invention achieves these and other objects by providing a secondary link between the remotely controlled device and the remote control device other than a primary wireless link used in normal operation and selectivity between the links. The secondary link may be selected for operation of the remotely controlled device and the remote control device in a point of sale package or display. This allows a plurality of remotely controlled devices which may be operated by the remote control device of another remotely controlled device to be operated individually, or where the primary link is line of sight in a configuration where the remote control device and the remotely controlled device are not configured to establish a line of sight primary link.

The secondary link may be another wireless link with characteristics amenable to individual operation of each remotely controlled device/remote control device pair or groups thereof, or may be a wired link. The secondary wireless link may be of the same or different type as the primary wireless link selected or configured to be capable of individual operation or operation in a point of sale package or display. In the preferred embodiment, the secondary link comprises a disconnectable wired link or coupling between the remotely controlled device and the remote control device in addition the primary wireless link or coupling.

"Wireless link" or "wireless coupling" are equivalent terms used herein in a broad sense and encompass a link or coupling that does not require the remotely controlled device and the remote control device to be tethered, and including but not limited to electromagnetic, optical including infrared, electrostatic, and acoustical and ultrasonic links and couplings. Similarly, "wired link" or "wired coupling" are equivalent terms used herein in a broad sense and encompass a link or coupling achieved through a tether (e.g., a cable which conducts electricity, light, sound, etc.) coupled to the remotely controlled device and the remote control device. "Try me" operation or "try me" configuration are used herein in a broad sense and encompass operation over the secondary link or coupling, regardless of whether the remotely controlled device and the remote control device are in a package or configured in a point of sale display. "Package" encompasses two or more packages tethered, linked or coupled together, unless the context indicates otherwise.

A combination incorporating a preferred embodiment of the invention includes a remotely controlled device having at least one controllable feature and a remote control device having at least one manually actuable control, in which the remote control device and the remotely controlled device are wirelessly coupled and operative to control the at least one feature upon actuation of the at least one control via the wireless coupling, and are also coupled by a disconnectable wired coupling. The remotely controlled device, the remote control device and the disconnectable wired coupling are operative to also control the at least one feature in response to activation of the at least one control. The combination allows selection of the wireless coupling or the wired coupling.

In accordance with one embodiment, the disconnectable wired coupling includes a first connector coupled to the remotely controlled device and a second connector coupled to the remote control device. In this combination, the remotely controlled device comprises a receiver adapted to receive signals wirelessly transmitted by the remote control device and a controller which controls operation of at least one feature of the remotely controlled device, where the controller is coupled to be responsive to a signal from at least one of the receiver and the first connector to control the at least one feature. And, in this combination, the remote control device comprises a transmitter and at least one manually actuated control, where the transmitter wirelessly transmits a signal adapted to control the at least one feature and be received by the receiver of the remotely controlled device in response to activation of the at least one control, and the first connector couples a signal adapted to control the at least one feature to the second connector in response to activation of the at least one control.

The wired coupling may be disconnected and the remotely control device operated by wireless remote control using the remote control device. The remotely controlled device and the remote control device may be configured so that wireless or wired operation is selected manually, e.g., by means of a switch or the physical presence or absence of a wired coupling. Where operation is dependent upon the presence or absence of the wired coupling, in the presence of the wired coupling, the remotely controlled device may be operated solely via the wired coupling or both wirelessly and via the wired coupling. Selection may also be made automatically by electronic detection of the presence or absence of a wired coupling. Thus, selection may be made manually or automatically.

A preferred combination comprises a manually operable switch coupled to enable the combination to selectively control the at least one feature wirelessly or through the disconnectable wired coupling.

A cable removably coupled to the remotely control device and the remote control device via connectors may provide the wired coupling, or the connectors may directly mate. Preferably, the connectors mate so that the wired coupling is disconnected simply by separating the remote control device from the remotely controlled device.

The combinations described above may comprise a package, preferably a point of sale package, holding the remotely controlled device and the remote control device, with the at least one control being accessible for activation from outside the package, or the remotely controlled device and the remote control device may configured in a point of sale display.

The remotely controlled device may be a toy, or a consumer electronics device such as a video (e.g., television) or audio device (e.g., receiver), or other device whose identity will be apparent from the disclosure herein A method incorporating a preferred embodiment for activating a remotely controlled device with a wireless remote control device associated therewith, comprises the steps of coupling the remotely controlled device and the remote control device with a disconnectable wired coupling and conditioning the remotely controlled device, the remote control device or both to operate via the wireless coupling when the remotely controlled device and the remote control device are coupled by the wireless coupling.

BRIEF DESCRIPTION OF THE DRAWINGS

The invention is illustrated in the figures of the accompanying drawings which are meant to be exemplary and not limiting, in which like numerals in the different figures refer to like or corresponding parts, and in which.

DETAILED DESCRIPTION OF THE PREFERRED EMBODIMENTS

Figure 1:
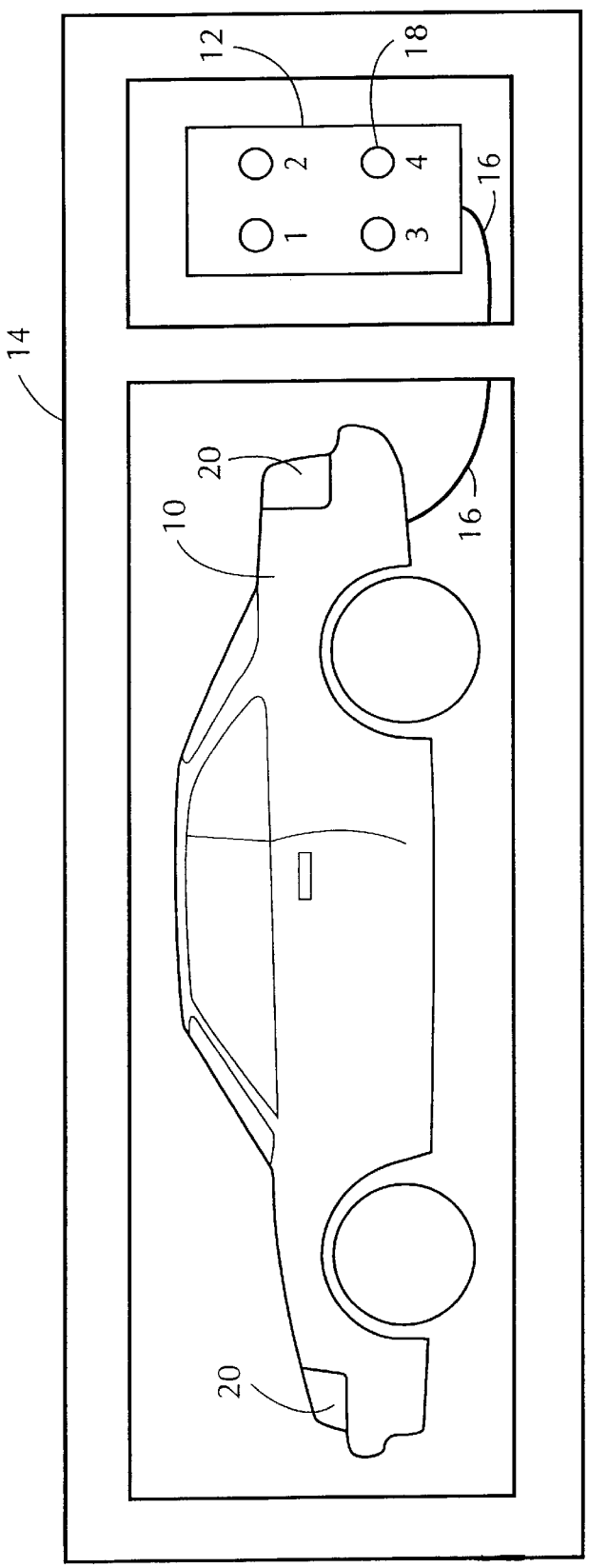
FIG. 1 is a schematic representation of a remotely controlled device and a remote control device in a point of sale package incorporating the invention.

Referring to FIG. 1, a remotely controlled toy car 10 and a remote control device 12 therefor are contained in a point of sale package 14 so that the toy car 10 and remote control device 12 are visible from outside the package 14. A cable 16 is coupled to the toy car 10 and the remote control device 12, which together with connectors 34 and 44 shown in FIGS. 2 and 3, form a wired coupling between the toy car 10 and the remote control device 12. Alternatively, as shown in FIG. 4 and described below, mating connectors 34, 44 on the toy car 10 and the remote control device 12 may form the wired coupling. The package 14 either has a flexible element overlaying at least one of the control buttons 18 or at least one of the control buttons 18 is uncovered. In either case, at least one of the control buttons 18 is accessible from outside the package to be pressed.

The toy car 10 and the remote control device 12 may have one or more optical devices 20 (e.g., car head lights and tail lights) and/or a sound device (not shown in FIG. 1). The toy car 10 may also include an electric motor (not shown in FIG. 1) for propelling the toy car. In normal remote control operation, pressing one or more buttons 18 on the remote control device 12 will cause an optical device or devices and/or the sound device and/or the electric motor to be energized. In the preferred embodiment, the toy car 10 and the remote control device 12 are as described in application Ser. No. 08/892,374.

One or more of the optical device(s) 20, the sound device and the motor may be operated while the toy car 10 and the remote control 12 are in the package 14. For example, pressing one or more buttons 18 on the remote control device 12 may cause the optical device(s) 20 to flash and/or a particular sound to be emitted by the sound device.

Many variations on the package 14 are possible. Some possibilities depend upon the particular feature of the toy car 10 that is made a "try me" feature controllable via wired coupling and the form that the wired coupling takes. For example, if only the sound device can be energized via cable 16, then no part of the toy car need be visible through the package 14.

Figure 2:
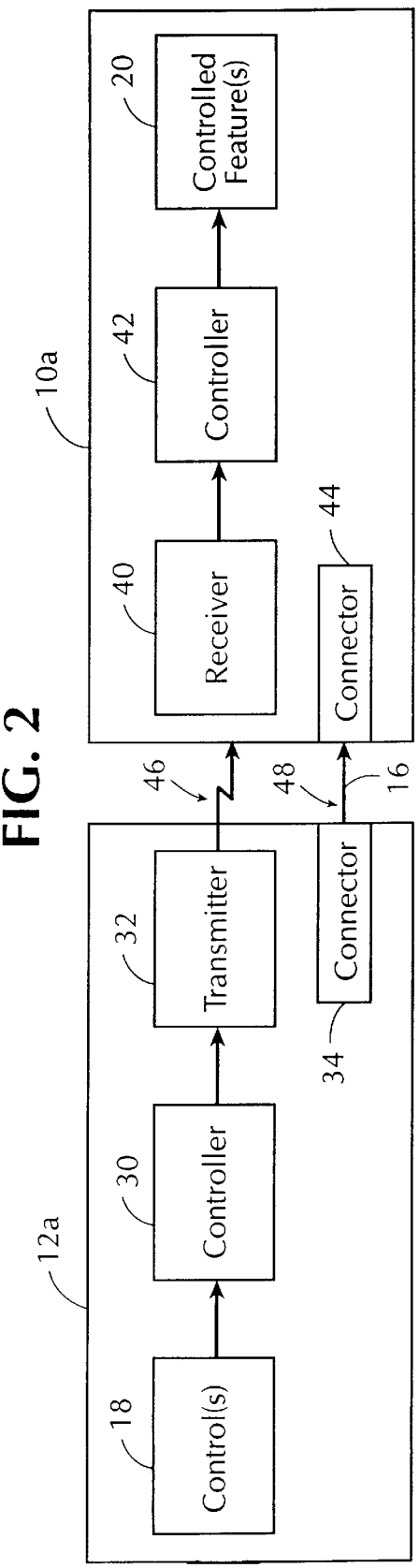
FIG. 2 is a block diagram illustrating one embodiment of the invention.

Referring to FIG. 2, a remote control device 12a according to the invention comprises one or more manually actuable controls 18, a controller 30, a transmitter 32 and a connector 34. A remotely controlled device 10a according to the invention comprises a receiver 40, a controller 42, a controlled feature 20 (e.g., an optical device in the case of toy car 10) and a connector 44. The remote control device 12a and the remotely controlled device 10a cooperate to provide a wireless coupling 46 therebetween. The manually actuable control(s) 18, the controller 30 and the transmitter 32 of the remote control device 12a, and the receiver 40, the controller 42 and the controlled feature 20 of the remotely controlled device 10a may all be conventional, or as described in Ser. No. 08/892,374.

Still referring to FIG. 2, the connectors 34 and 44 provide a wired coupling referenced generally by 48 between the remote control device 12a and the remotely controlled device 10a. A cable 16 may be connected to connectors 34 and 44, or alternatively, the connectors 34 and 44 may be mating connectors that connect to each other without a cable therebetween. The connectors 34 and 44 of wired coupling 48, and the cable 16, if used, are consistent with the type of wired coupling employed. For a simple electrical wired coupling, the connectors 34 and 44 are simply connected to appropriate electrical circuits, and the cable 16 comprises one or more electrical wires. For an optical wired coupling, cable 16 may comprise a fiber optical cable coupled to appropriate optical circuits via appropriate connectors, etc.

The remotely controlled device 10a operates conventionally under control of the remote control device 12a via the wireless coupling 46. In addition, the remotely controlled device 10a, the remote control device 10a and the wired coupling 48 cooperate to provide the "try me" feature described herein. The remotely controlled device 10a and/or the remote control device 12a may be configured so that wireless or wired operation is dependent upon the presence or absence of the wired coupling 48. For example, in the presence of the wired coupling, the remotely controlled device 10a may be operated solely via the wired coupling 46 or both wirelessly and via the wired coupling. Alternatively, as represented in FIG. 3, operation may be manually selected by means of a manually operable switch 50.

Figure 3:
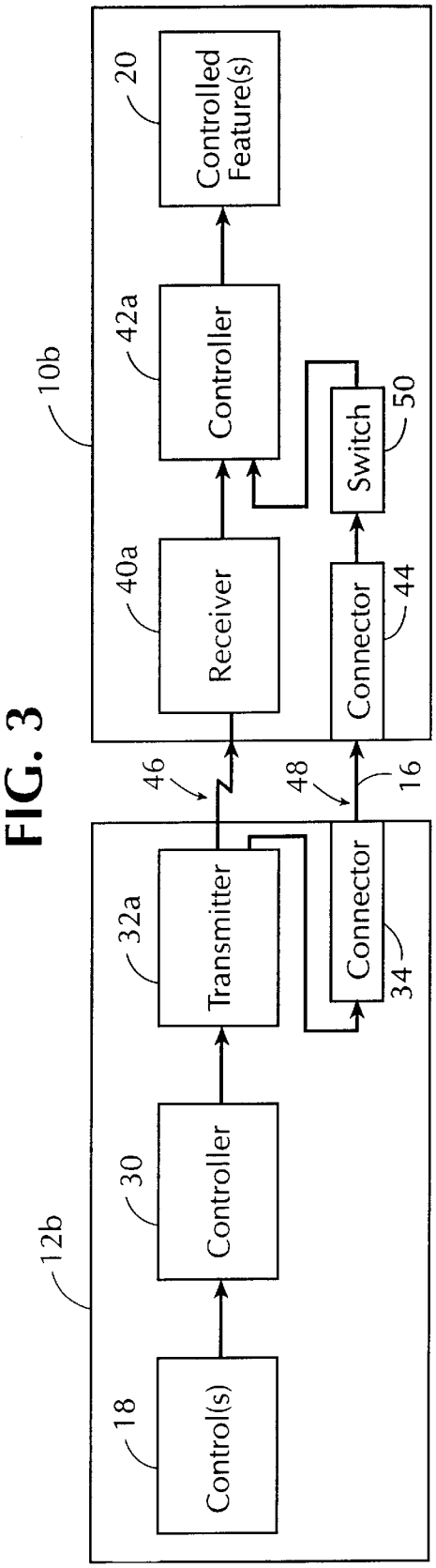
FIG. 3 is a block diagram illustrating another embodiment of the invention.
Figure 4:
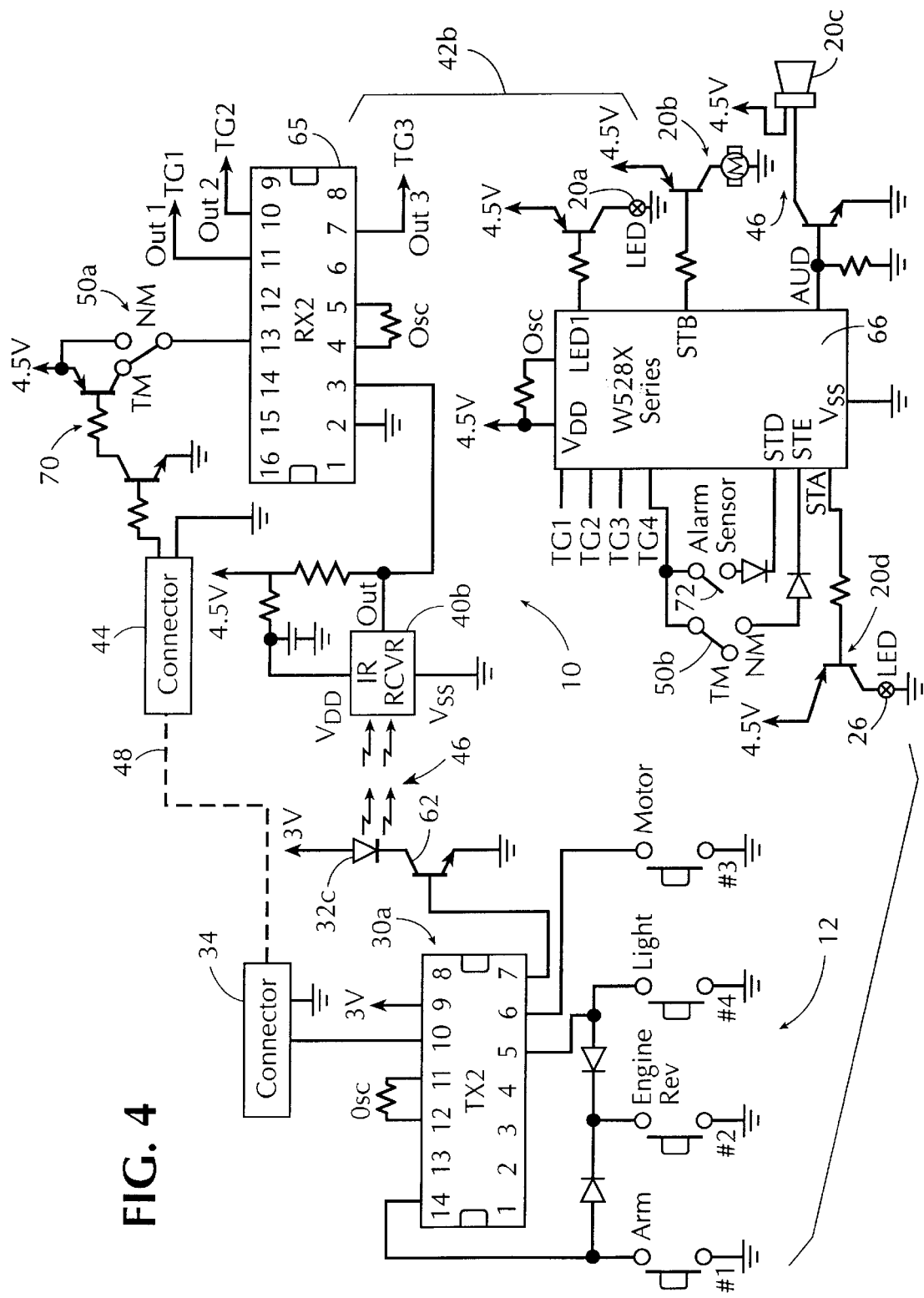
FIG. 4 is a schematic circuit diagram of one embodiment of the invention.

In the embodiment represented in FIG. 3, the switch 50 couples the wired coupling 48a to the controller 42a. Operation and/or the state of the switch couples the wired coupling 48a to the controller 42a to configure the remotely controlled device 10b for "try me" operation or remote control wireless operation. The connector 44 here is coupled to the switch 50. In this embodiment, the connector 34 is coupled to the transmitter 32b of the remote control device 10b, which upon actuation of a control 18 outputs an appropriate signal to the connector for "try me" operation. The transmitter 32a may be configured so as not to transmit a wireless signal when it outputs a signal to connector 34, or signals may be wirelessly transmitted and output to connector 34 when a control 18 is activated. Preferably, the controller 42a in the remotely controlled device 10b and/or the receiver 40a is conditioned so as not to respond to a wireless signal when the remotely controlled device 10b is configured for "try me" operation (e.g., a wired coupling is present or a switch is in a "try me" state).

FIG. 4 depicts the embodiment of the invention depicted in FIG. 1 which operates with the remotely controlled toy described in application Ser. No. 08/892,374. The connectors 34 and 44 on the remote control device 12 and the toy car 10 mate to form the wired coupling. The toy described in that application includes an IR remote control device which controls a security alarm in the toy car, lights and sound emitted by the toy car and the toy car's motor. The remote control device 12 herein is the same as described in application Ser. No. 08/892,374, and includes a modulator 30a and an IR transmitter 32c, except that the connector 34 is also connected to the modulator 30a. In response to activation of one or more buttons 18, modulator 30a outputs a signal on pin 7 to transmitter 32c and a signal on pin 10 to connector 34, and remote control device 12 outputs signals on the wireless coupling 46 and the wired coupling 48b.

The remotely controlled toy car 10 herein includes an IR receiver 40b, a controller 42b comprising a demodulator 65 and a controller circuit 66, and controlled features 20a, b, c and d, which except as described below are all the same as those in application Ser. No. 08/892,374. In addition, the toy car 10 includes the connector 44, a switch 50a, 50b and a driver circuit 70. The switch 50a, b is two pole, two position: "TM" (for "try me" operation) and "NM" (for "normal mode" wireless operation). In the "TM" position, switch portion 50a couples the driver circuit 70 to receive signals from the modulator 30a via the wired coupling 48 (connector 34 and connector 44) and to supply current to the demodulator 65 of the controller 42b. In the "NM" position, switch portion 50a disconnects the driver circuit 70 from the demodulator 65, thereby electronically disconnecting the disconnectable wired coupling.

An alarm sensor 72 in the toy car 10 is connected differently than in application Ser. No. 08/892,374 to disable the sensor 72 when the toy car 10 is configured for "try me" operation. Switch portion 50b selectively couples the TG4 output of the controller circuit to the alarm sensor 72 in the "NM" position or to the STE input of controller circuit 66 in the "TM" position. Other features may be controlled by the control circuit 66, such as an alarm indicator, not shown.

The remotely controlled toy 10 and the remote control device 12, the circuitry of which is depicted in FIG. 4, operate as described in Ser. No. 08/892,374, and in addition implement the "try me" feature described herein to activate one or more of features 20a–20d. The switch 50a, b is set for "try me" operation at the factory. Therefore, the toy cars 10 while in packages 14 will not respond to signals received via a wireless coupling from the remote control device in the same or another package. As mentioned above, a cable may couple connectors 34 and 44, or they may be mating connectors. If the package 14 permits, the connectors 34 and 44 may be mating connectors so that the wired coupling is disconnected simply by separating the remote control device 12 from the toy car 10.

A preferred embodiment of the invention has been described in connection with a remote controlled toy car. However, the invention has application with other toys and devices. For example, the invention may be used with an infrared toy target game, a line of which is currently available from Toymax Inc. under the trademarks LASER CHALLENGE, LASER CHALLENGE PRO and other trademarks. These toys include speakers and lights which are activated remotely, and which could also be activated in a package by the secondary link and the wired coupling described herein. The invention may also have application to remotely controlled devices and remote control devices which are not contained within the same package but nonetheless present the need of "try me" operation other than in normal wireless operation. For example, wireless operation of remote control devices in point of sale displays may not be suitable or possible in some instances. In such applications, the remote control device may be coupled to the remotely controlled device employing wired coupling as disclosed herein with the remotely controlled device not in a package.

While the invention has been described and illustrated in connection with preferred embodiments, many variations and modifications, as will be apparent to those of skill in the art, may be made without departing from the spirit and scope of the invention. The invention as set forth in the appended clams is thus not limited to the precise details of construction set forth above as such variations and modifications are intended to be included within the spirit and scope of the invention as set forth in the defined claims.

What is claimed is:

1. In the combination comprising a remotely controlled device having at least one controllable feature and a remote control device having at least one manually actuable control, in which the remote control device and the remotely controlled device are coupled in a primary wireless link operative to control the at least one feature in response to actuation of the at least one control, the improvement comprising a package holding the remotely controlled device and the remote control device such that at least one feature when activated is discernible from outside the package, a secondary link to the remotely controlled device at least in the package and a selector which conditions the remotely controlled device to operate via the primary link alone or using the secondary link, the remote controlled device not responding to another similar remote control device solely wirelessly in response to actuation of the another remote control device when the selector is configured to condition the remotely controlled device to operate the secondary link.

2. The combination of claim 1 wherein the selector comprises a switch.

3. The combination of claim 1 wherein the remote control device is positioned in the package so that the at least one control of the remote control device is accessible for manual activation from outside the package, wherein the at least one feature is activated in response to activation of the at least one control using the secondary link when the remotely controlled device is conditioned by the selector to use the secondary link control of the remote control.

4. In the combination comprising a remotely controlled toy device having at least one controllable feature and a remote control device having at least one manually actable control, in which the remote control device and the remotely controlled device are coupled in a primary wireless link operative to wirelessly control the at least one feature in response to actuation of the at least one control, the improvement comprising a package holding the remotely controlled device and the remote control device such that at least one feature when activated is discernible from outside the package, a secondary link to the remote controlled device at least in the package and a selector which conditions the remote controlled device to operate via the primary link alone or using the secondary link, the remote controlled device being operative using the secondary link to, also control the at least one feature when conditioned by the selector to use the secondary link, the remote controlled device not responding another remote control device solely wirelessly in response to actuation of a control of another remote control device when the selector is configured to condition the remotely controlled device to operate using the secondary link.

5. The combination of claim 4 wherein the selector includes a switch.

6. The combination of claim 4 wherein the remote control toy device is a toy vehicle.

7. The combination of claim 4 wherein the remote control device is positioned in the package so that the at least one control of the remote control device is accessible for manual activation from outside the package, and wherein the at least one feature is activated in response to activation of the at least one control using the secondary link when the remotely controlled device is conditioned by the selector to use the secondary link.

* * * * *